(12) United States Patent
Galvin et al.

(10) Patent No.: US 7,747,679 B2
(45) Date of Patent: Jun. 29, 2010

(54) MANAGING A COMMUNICATION AVAILABILITY STATUS

(75) Inventors: James P. Galvin, Georgetown, KY (US); Andrew L. Schirmer, Andover, MA (US); Amy D. Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 11/840,440

(22) Filed: Aug. 17, 2007

(65) Prior Publication Data

US 2009/0049168 A1 Feb. 19, 2009

(51) Int. Cl.
*G06F 15/16* (2006.01)
(52) U.S. Cl. ............ 709/203; 709/204; 709/205; 709/223; 709/224; 455/412.2
(58) Field of Classification Search ............ 709/203, 709/205, 223, 224; 455/412.2
See application file for complete search history.

(56) References Cited

U.S. PATENT DOCUMENTS

| | | | |
|---|---|---|---|
| 6,349,335 B1 | 2/2002 | Jenny | |
| 6,920,478 B2 * | 7/2005 | Mendiola et al. ............ 709/203 |
| 7,084,754 B2 | 8/2006 | Benejam et al. | |
| 7,171,448 B1 * | 1/2007 | Danielsen et al. ............ 709/205 |
| 7,283,805 B2 * | 10/2007 | Agrawal ............ 455/412.2 |
| 2003/0061622 A1 * | 3/2003 | Nebiker et al. ............ 725/117 |
| 2004/0254998 A1 | 12/2004 | Horvitz | |
| 2006/0117087 A1 | 6/2006 | Demsky et al. | |
| 2007/0250622 A1 * | 10/2007 | Granito ............ 709/224 |

OTHER PUBLICATIONS

Peter Saint-Andre, XEP-0149: Time Periods, <http://www.xmpp.org/extensions/xep-0149.html> (Jan. 24, 2006).
Chung-Ming Huang et al., Timed Protocol Verification for Estelle-Specified Protocols, Laboratory of Computer Aided Protocol Engineering (LOCAPE), Institute of Information Engineering National Cheng Kung University, Tainan, Taiwan 70101 R.O.C. (Jul. 1995).
H.P. Rajaniemi et al., SIP and Presence (Publication Date Unknown).
Schulzrinne, RFC 4481 on Timed Presence Extensions to the Presence Information Data Format (PIDF) to Indicate Status Information for Past and Future Time Intervals, <http://www1.ietf.org/mail-archive/web/ietf-announce/current/msg02701.html> (Jul. 2006).

(Continued)

*Primary Examiner*—Jinsong Hu
(74) *Attorney, Agent, or Firm*—Cuenot, Forsythe & Kim, LLC

(57) ABSTRACT

In response to a first user becoming active on a communication device, a first availability status can be automatically established as a current availability of the first user. A first time period can be automatically identified. During the first time period, the first availability status can be maintained as the current availability of the first user to at least a second user. In response to the first time period elapsing, a second availability status can be automatically established as the current availability of the first user to the second user.

20 Claims, 5 Drawing Sheets

OTHER PUBLICATIONS

Schulzrinne, Timed Presence Extensions to the Presence Information Data Format (PIDF) to Indicate Status Information for Past and Future Time Intervals, <http://www.rfc-editor.org/rfc/rfc4481.txt> (Jul. 2006).

Coping Downloads, <http://www.surfpack.com/software/coping/> (last visited Aug. 17, 2007).

Computer: Instant Messaging, <http://www.halfbakery.com/category/Computer_3a_20Instant_20Messaging> (last visited Aug. 17, 2007).

Buddy Timer, <http://www.halfbakery.com/idea/Buddy_20timer#1109907380> (Nov. 2003).

Yahoo Search Directory, <http://dir.yahoo.com/Computers_and_Internet/Software/Internet/Instant_Messaging/AOL_Instant_Messenger_AIM_/> (last visited Aug. 17, 2007).

Awaybox, <http://www.awaybox.com/> (last visited Aug. 17, 2007).

* cited by examiner

US 7,747,679 B2

MANAGING A COMMUNICATION AVAILABILITY STATUS

BACKGROUND OF THE INVENTION

Often, when a user of an instant messaging (IM) system becomes available, she is suddenly inundated with messages from people who have been waiting for her to appear online. This may occur when she first logs onto the IM system, when her status on the IM system changes from "away" to "available", when her status changes from "in a meeting" to "available", and so forth. The problem is compounded further in systems which automatically notify other users when a user has become available, for instance in response to a request by such other users. This service is sometimes referred to as a "camp-on" service. Such circumstances often discourage a user from logging onto her IM system for fear of being overwhelmed by messages.

Some IM systems allow a user to log onto the system with a particular status of her choice. That is, rather than logging onto the system with an "available" status, the user can log on with another status, for instance "away". If the user later wishes to make her presence known to other IM users, she must remember to change her status to "available", in which case she again risks being inundated with messages.

BRIEF SUMMARY OF THE INVENTION

The present invention relates to communication of messages. One embodiment of the present invention can include managing a communication availability status. The method can include, in response to a first user becoming active on a communication device, automatically establishing a first availability status as a current availability of the first user and automatically identifying a first time period during which the first availability status can be maintained as the current availability of the first user to at least a second user. The method also can include, in response to the first time period elapsing, automatically establishing a second availability status as the current availability of the first user to the second user.

Another embodiment of the present invention can include a method of managing a communication status. Such method can include establishing a first availability status as a current availability of a first user and identifying a first time period during which the first availability status can be maintained as the current availability of the first user to at least a second user. The method also can include identifying a second time period during which the first availability status can be maintained as the current availability of the first user to at least a third user. Responsive to the first time period elapsing, a second availability status can be automatically established as the current availability of the first user to the second user. Responsive to the second time period elapsing, a second availability status can be automatically established as the current availability of the first user to the third user.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
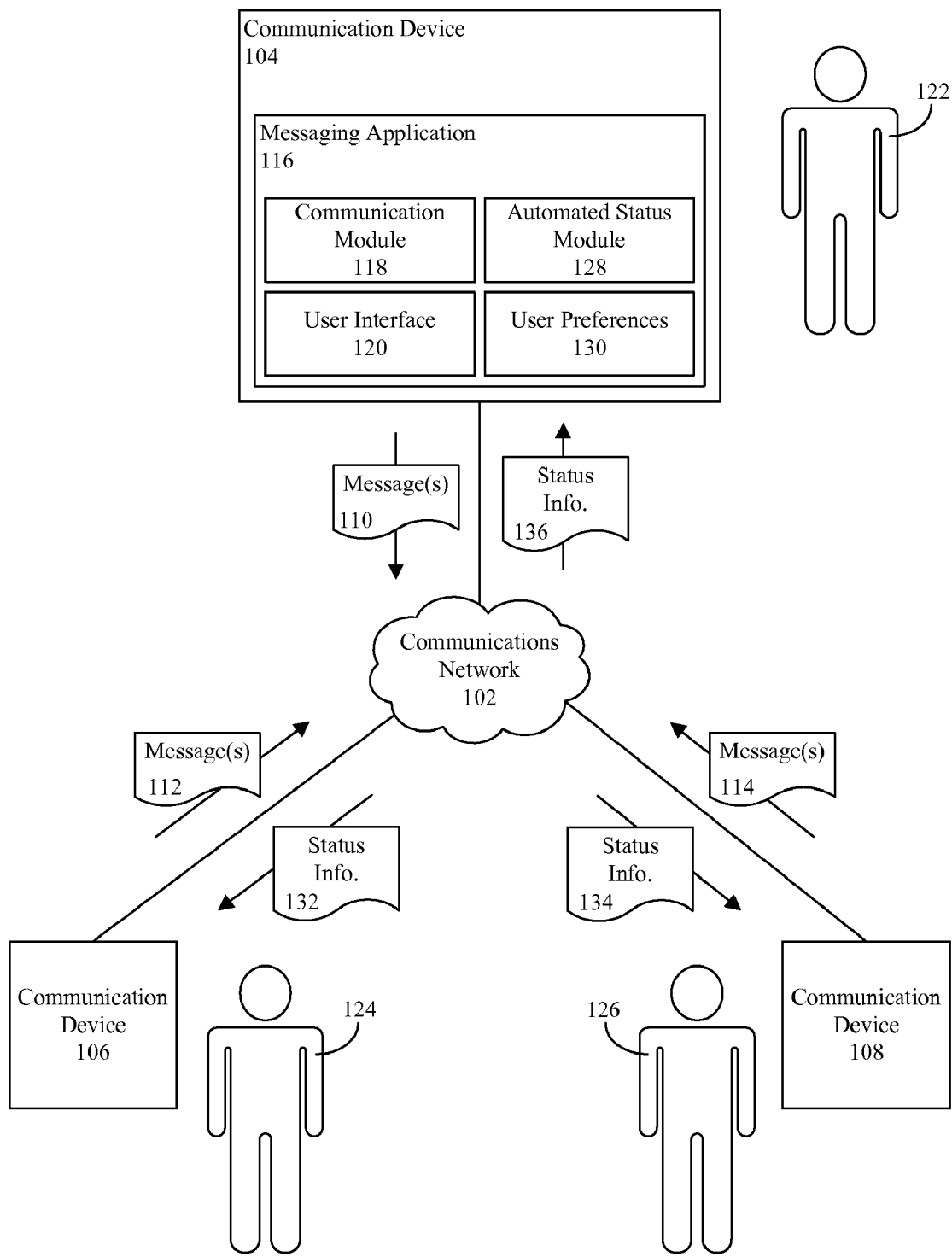
FIG. 1 is a block diagram illustrating a communications system in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, or an optical fiber. The computer-readable media also can be implemented as computer storage media, examples of which include, but are not limited to, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk read/write (CD-R/W), or a DYD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like.

However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters. Such network adapters can communicate via wired or wireless communication links.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram illustrating a communications system 100 in accordance with one embodiment of the present invention. The communications system 100 can include a communications network 102, which may comprise any suitable network infrastructure, for example a wide area network (WAN), such as the Internet, the World Wide Web, a cellular communications network, a public switched telephone network (PSTN), and the like. Other examples of suitable network infrastructure may include, but are not limited to, a radio access network (RAN), a local area network (LAN), a metropolitan area network (MAN), a WiFi network, a Mesh network. In that regard, the communications network 102 can include wired and/or wireless communication links and can be implemented in accordance with any suitable communications standards, protocols, and/or architectures, or a suitable combination of such standards, protocols, and/or architectures.

The communications system 100 also can include one or more communication devices 104, 106, 108 which communicate messages 110, 112, 114 via the communications network 102. The communication devices 104-108 can be, for instance, computers, mobile stations (e.g. mobile telephones, mobile radios, mobile computers, personal digital assistants, or the like), set top boxes, access terminals, subscriber stations, gaming consoles, user equipment, or any other devices suitably configured to communicate via the communications network 102. As such, the communication devices 104-108 can comprise one or more processors, computer-usable mediums, network adapters, I/O devices, such as those previously described, and/or other suitable components.

The communication device 104 can include a messaging application 116 that implements the methods and processes described herein. The messaging application 116 can comprise a communication module 118 configured to send the message(s) 110 to the communication devices 106, 108. For example, the communication module 118 can receive message information, encode the message information into a suitable message format (e.g. into one or more packets or frames), and communicate the message in accordance with a suitable messaging protocol. In addition, the communication module 118 can receive the messages 112, 114 from other communication devices 106, 108 and extract message information from such messages 112, 114. The messages 110-114 can include text, audio and/or graphical information. In one embodiment, the messages can be instant messages. As used herein, the term "instant message" means a message that is sent in real time, contemporaneously, or otherwise without significant delay.

The messaging application 116 also can include a user interface 120 for receiving user inputs and presenting information to a user 122 of the communication device 104 (hereinafter "first user"). Such information can include, for instance, the current availability status and anticipated availability status of the first user 122, a list of one or more contacts (e.g. a second user 124, a third user 126, etc.) with whom messages 110-114 can be communicated, the current availability status and anticipated availability status of such users 124, 126, messages communicated to or from the first user 122, files communicated to or from the first user 122, status prompts, reminders, user preferences, and so on. In one embodiment, the user interface 120 can be a graphical user interface, though this need not be the case. For example, a command line interface also may be used.

The messaging application 116 further can include an automated status module 128 (hereinafter "status module") configured to indicate to other users 124, 126 the availability status of the first user 122. For instance, the status module 128 can receive user preferences 130 from the first user 122 and store such preferences 130 to a computer-usable medium.

Based on the user preferences 130, the automated status module 128 can generate status information 132, 134 and, via the communication module 118, communicate the status information 132, 134 to the communication devices 106, 108 associated with the respective users 124, 126.

In one embodiment, in response to the first user 122 becoming active on the communication device 104, for example by logging onto the communication device 104 or entering an input into the user interface 120 (e.g. via a mouse, keyboard or voice recognition system), the status module 128 can automatically establish a first availability status as a current availability of the first user 122. In another embodiment, the first availability status can occur in response to a planned appointment, activity or event, for instance at the beginning of a meeting or an end of the meeting. In such an arrangement, the status module 128 can interface with a calendaring program via the communication module 118 to identify the planned appointment, activity or event. Suitable techniques to receive such information from a calendaring program are known to those skilled in the art.

The first availability status can be, for example, "available", "unavailable", "do not disturb", "away", and "I prefer not to be disturbed", and so on. Still, a myriad of other availability status indicators can be used, and the invention is not limited in this regard.

The status module 128 also can automatically identify a first time period during which the first availability status is to be maintained as the current availability. In one embodiment, the time period can be based on the user preferences 130, and may vary based on time of day, day of the week, day of the month, day of the year, etc. For example, the user preferences 130 can indicate that the first period is to be thirty minutes in the morning and twenty minutes in the afternoon. In another embodiment, the first time period can be a default time period, for example a default time period established for a particular day of the week. In yet another embodiment, the first time period can correspond to the first availability status. For example, if the first availability status is "unavailable" the first time period can be sixty minutes, whereas the first time period can be ninety minutes if the first availability status is "do not disturb".

When the first availability status is established, the status module 128 can communicate an indicator (hereinafter "first indicator") that indicates such status to the communication devices 106, 108 of any users 124, 126 having the first user 122 in their contact list. Such indicator can be sent as the status information 132, 134. Further, the status module 128 can allow or deny messages sent from the users 124, 126 to the first user 122 in accordance with the first availability status. For instance, if the first availability status is "unavailable", messages communicated to the first user 122 can be denied or blocked, and an indication of such action can be communicated to the user who sent the message.

The status module 128 can wait for the first time period to elapse. In response to the first time period elapsing, the status module 128 can automatically establish a second availability status as the current availability of the first user. Such status can be, for example, "available". When the second availability status is established, the status module 128 can communicate a second indicator that indicates such status to one or more of the communication devices, for instance as status information 132 communicated to the communication device 106 of the second user 124. Again, the status module 128 can allow or deny messages sent from the user 124 to the first user 122 in accordance with the second availability status.

In addition, the status module 128 also can automatically identify a second time period during which the first availability status is to be maintained as the current availability of the first user 122 to another user or group of users. The second time period also can be a default time period or based on the user preferences 130, and may vary based on time of day, day of the week, day of the month, day of the year, etc.

When the first time period has elapsed, the availability status of the first user 122 to the second user 124 can be changed, while the current availability status of the first user 122 to the third user 126 can remain unchanged until the second time period elapses. In response to the second time period elapsing, the status module 128 can automatically establish the second availability status as the current availability of the first user 122 to the third user 126. The status module 128 also can communicate an indicator of the second availability status to the third communication device 108, for instance, as status information 134. Further, the third user 126 can be allowed or denied permission to communicate messages to the first user 122 in accordance with the second availability status.

In another embodiment, in lieu of the first available status, a third availability status that is different than the first availability status can be established as the current availability of the first user 122 to the third user 126 prior to the expiration of the second time period. Similarly, in lieu of the second available status, a fourth availability status that is different than the second availability status can be established as the current availability of the first user 122 to the third user 126 after expiration of the second time period. Indicators of the third and fourth availability statuses can be communicated to the communication device 108 of the third user 126. Again, the third user 126 can be allowed or denied permission to communicate messages to the first user 122 in accordance with the applicable available status information.

Notably, at the expatriation of a particular time period, rather than simultaneously alerting all users 124, 126 that the first user 122 has become available, or allowing messages from any of the users 124, 126 to be simultaneously communicated to the first user 122, such alerts and message communications can be staggered in time. Accordingly, the likelihood of the user 122 being simultaneously inundated with messages from the various users 124, 126 can be significantly reduced.

In one aspect of the inventive arrangements, the second user 124 can be assigned to a first group of users, and the third user 126 can be assigned to a second group of users, and the first and second groups of users can be associated with different time periods. For example, the second user 124 can be assigned to a first group having high priority, and the high priority group can be associated with the first time period. Similarly, the third user 126 can be assigned to a second group having medium priority, and the second group can be associated with the second time period. Of course, more or fewer than two groups of users and more or fewer than two time periods can be identified, and the invention is not limited in this regard.

In a further embodiment, period indicators that indicate the various time periods can be communicated to the users 124, 126 to whom the time periods are applicable. For example, if the second user 124 is assigned to the first group of users, the status module 128 can communicate to the communication device 106 a first period indicator that indicates the first time period. Such indicator can be communicated with the status information 132. Similarly, if the third user is assigned to the second group of users, the status module 128 can communicate to the communication device 108 a second period indicator that indicates the second time period. Again, the second period indicator can be communicated with the status information 134.

The various period indicators can be presented to the users 124, 126 to indicate an amount of time remaining before the availability status of the first user 122 changes. For example, the first period indicator can be communicated with the status information 132 to alert the second user 124 that the first user 122 will be available to communicate with the second user 124 when the first time period expires. Similarly, the second period indicator can be communicated with the status information 134 to alert the third user 126 that the first user 122 will be available to communicate with the second user 126 when the second time period expires.

In one embodiment, the first user 122 can be provided an option to extend the first time period, the second time and/or any other time periods. For instance, an alert can be provided before expiration of the first time period, and a user selectable option to extend one or more time periods can be associated with the alert. The time at which the subsequent availability statuses are established can be automatically delayed by the amount of time the respective time periods are extended. When a time period is extended, the amount of time remaining in the extended time period can be communicated to other users that may be affected, such as those users 124, 126 having the first user 122 in their respective contact list. In another embodiment, periodic updates of the various time periods may be communicated to the other users 124, 126, regardless of whether the time periods have been extended.

The extension of time features can be beneficial if, for example, the user 122 logs onto the communication device 104, but becomes distracted before he is able to complete his usual morning tasks. The ability to restart the current time period can provide the first user 122 additional time to become situated prior to being inundated with messages.

In another embodiment, the status module 128 can be configured to alert the first user 122 as to the availability status of other users, such as the users 124, 126. For example, the status module 128 can receive status information 136 for other users 124, 126 via the communication module 118. Via the user interface 120, the status module 128 can present to the user 122 one or more indicators corresponding to such status information 136. For example, the user interface 120 can present an availability status icon next to an identifier (e.g. user name) associated with each user 124, 126 in a contact list.

In an embodiment in which a time period indicator and second availability status indicator are received for a user 124, the status module 128 also can present such information to the user 122 via the user interface 120. Moreover, the status module 128 also can track the amount of time remaining in the time period. For instance, an icon of a timer can be presented next to the user's identifier in the contact list, as well as an icon indicating the second availability status of the user 124 that will be established at the expiration of the time period.

Further, the status module 128 can prompt the first user 122 when the status of another user changes. For example, an alert can be presented to the first user 122 when one of the users 124, 126 becomes available for messaging. An alert also can be presented when one of the users 124, 126 becomes unavailable.

Figure 2:
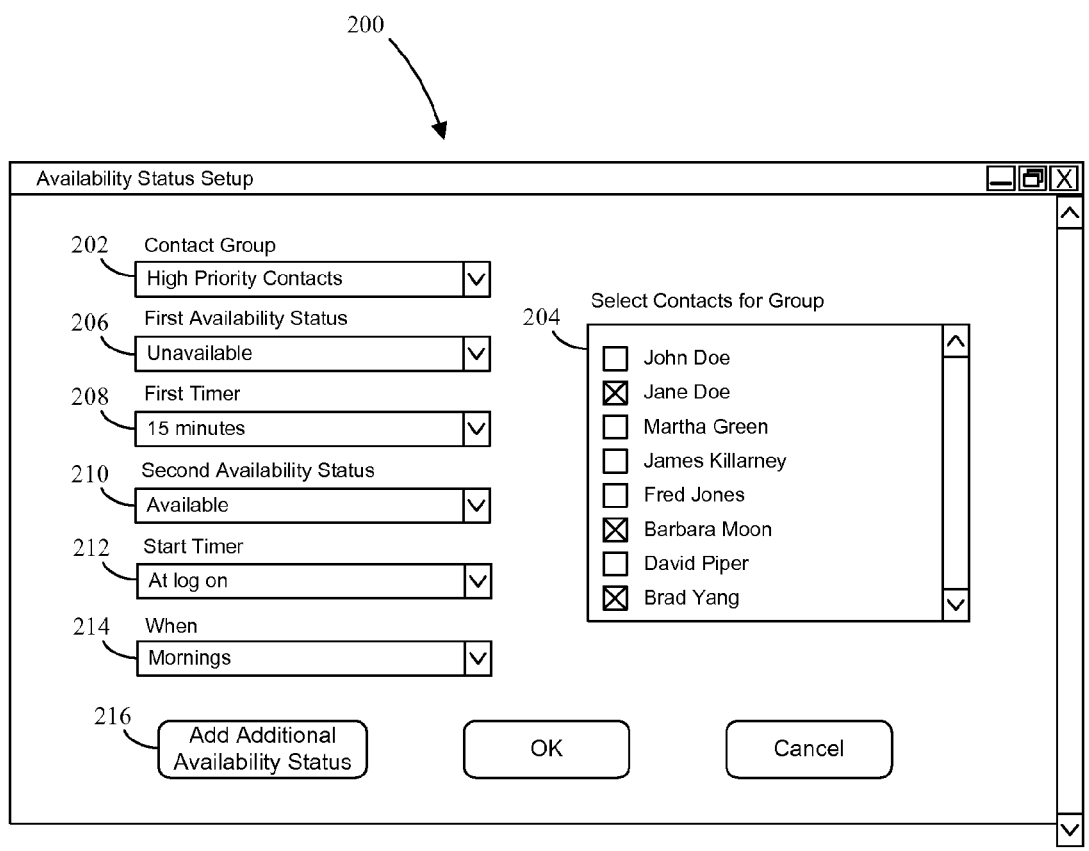
FIG. 2 is a view of a user interface in accordance with one embodiment of the present invention.
Figure 3:
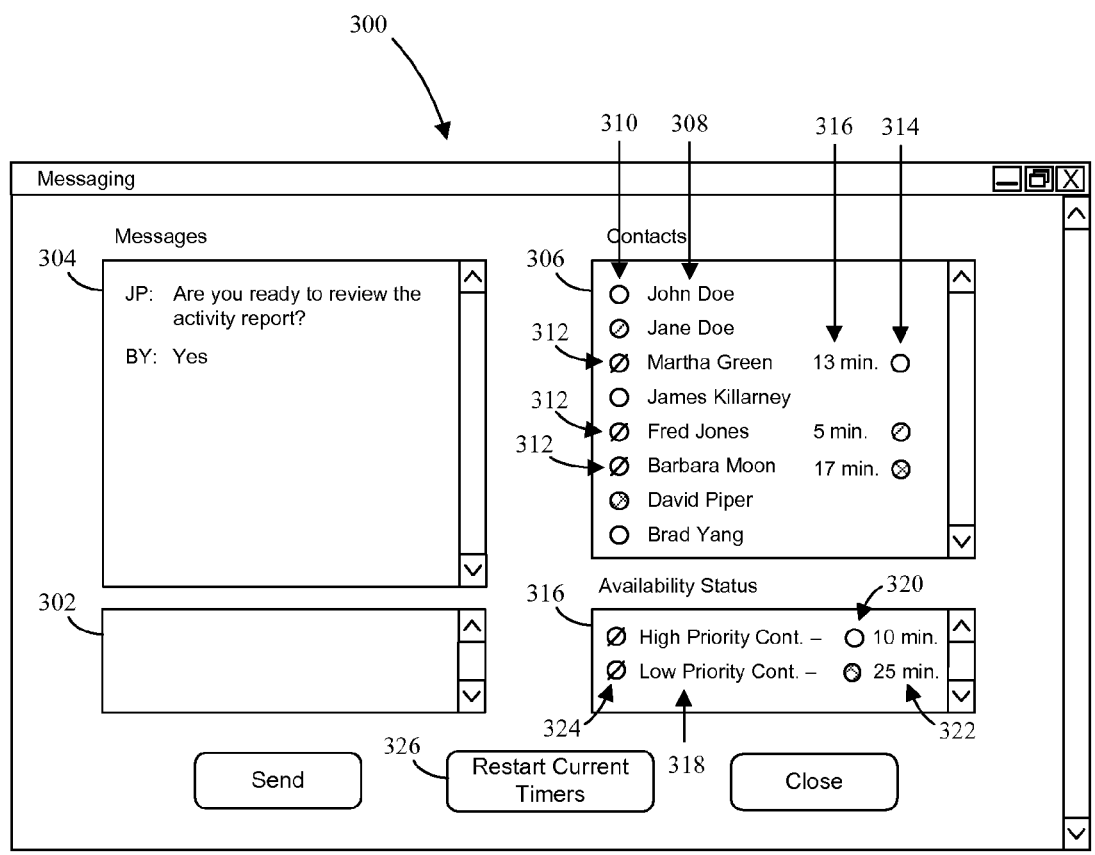
FIG. 3 is a view of a user interface in accordance with another embodiment of the present invention.
Figure 4:
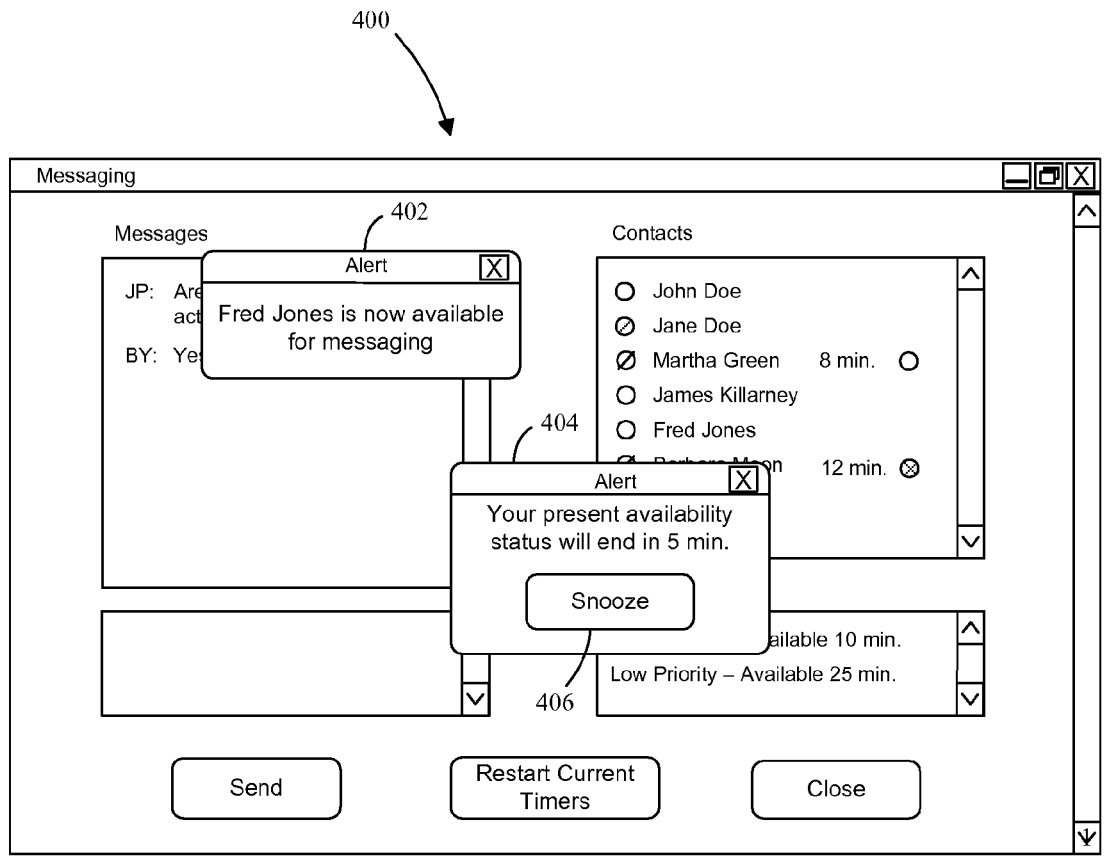
FIG. 4 is a view of a user interface in accordance with another embodiment of the present invention.

FIGS. 2, 3 and 4 present various examples of views that may be provided by the user interface. Such views include various input fields in which the user can select or enter desired information. Such input fields can include, but are not limited to, text boxes, menus, radio buttons, check boxes, buttons, icons and/or other suitable user interface items. Similarly, the views may include various buttons which may be selected by the user, but other selectable graphics or icons also may be used. In that regard, the views, as well as the associated input fields and buttons, depicted in the various figures are merely examples that are not to be interpreted as limiting, but merely as a basis for the claims and as a representative basis for teaching one skilled in the art to variously employ the present invention in virtually any appropriate user interface.

FIG. 2 is a view 200 of the user interface in accordance with one embodiment of the present invention. The view 200 can be presented to indicate a user's presently applied availability status settings, and to facilitate configuration of such settings. The view 200 can include an input field 202 in which the user can select a particular contact group. The user can select the contact group from a list of one or more known groups contained in a menu associated with the input field 202, or the user can enter a new contact group into the input field 202. A contact list 204 can be presented to indicate which contacts are associated with the selected contact group, and to allow the user to select or deselect such contact associations. In an embodiment in which contact groups are not used, the contact list 204 can be presented in lieu of the input field 202.

The view 200 also can include an input field 206 in which the user can select a first availability status, an input field 208 in which the user can select the first time period, and an input field 210 in which the user can select the second availability status. The user can enter such selections by activating menus associated with the respective input fields 206-210 and selecting appropriate menu items. For example, the user can select the first availability status from a menu of availability status identifiers associated with the input field 206.

If a desired menu item is not presented in a menu, the user can enter a desired identifier into the appropriate input field 206-210. For example, if the user desires the first time period to be 25 minutes, but 25 minutes is not indicated as a menu item in the menu for the input field 208, the user can enter 25 minutes into the input field 208, for example by typing the value or uttering the value into a speech recognition system. Similarly, the user can enter a desired availability status into the input field 206 or the input field 210. An additional configuration view (not shown) can be presented to prompt the user to enter additional information to associate the user-entered identifier with various configuration options (e.g. allow or deny messages, provide specific alerts to other users attempting to send messages, etc.). Once configured, the new availability status identifier can be added to menus presented for other availability input fields.

An input field 212 can be provided to receive a user selection as to when to start the first timer. Such selections can include, but are not limited to, "at log on", "responsive to a user input", "after meeting", "before meeting", "after event", "before event", "before appointment", "after appointment", and so on. As noted, the meeting, event, and appointment selections can be associated with another application, such as a calendaring application. If a user chooses any of these selections, an additional view (not shown) may be presented to the user to select such meeting, event or appointment.

An input field 214 also can be presented to indicate when to apply the availability status configuration settings. As noted, menu selections can include any of a variety of time frames that may be identified. Examples of such time frames include, but are not limited to, "mornings", "after lunch", "weekday mornings", a day or days of the week, a day or days of the month, etc.

A button 216 can be selected by a user to associate the selected contact group with additional availability statuses and timers. For example, another view (not shown) can be presented, or the view 200 can be expanded to include additional input fields.

If the user desires to configure the availability status information for another contact group after the configuration is complete for the presently selected contact group, such other contact group can be selected via the input box 202.

FIG. 3 is a view 300 of the user interface in accordance with another embodiment of the present invention. The view 300 can be presented as a messaging workspace. In addition to a message input field 302 and a message display field 304, which are known to the skilled artisan, the view can include a contact field 306 that displays contact availability information. For example, for each of the contacts 308, a first identifier 310 can be presented to indicate a current availability of the respective contact. Such indicators can comprise icons, graphics, text, or any other suitable identifiers. For contacts 312 that are not currently available or have limited availability, a respective indicator 314 can be presented to indicate another availability status that will be established for such contacts 312. In addition, a respective time indicator 316 can be presented to indicate when such other availability status will be established. The time indicator 316 can be depicted in any suitable manner.

Further, an availability status field 316 can be presented to indicate the current availability status of the current user of the messaging application. The availability status field 316 can indicate contacts or groups of contacts 318, the availability status 320 that will be established for such contacts 318, and an indicator 322 as to when the respective availability statuses will be established. Current availability status indicators 324 also can be shown. Again, such information 318-324 can be presented in any suitable manner and the invention is not limited in this regard.

In addition, a button 326 can be presented. The button 326 can be selected by the user to restart any time periods presently being timed. For example, if one or more of the time periods have already been started, the time periods can be restarted to extend the time before an availability status change. In response to the user selecting the button 326, the user can be provided another view (not shown) from which the user can select one or more of the time periods to restart, or to cancel the restart request.

FIG. 4 is a view 400 of the user interface in accordance with another embodiment of the present invention. The view 400 depicts an alert 402 that may be presented to the user in response to the availability status of another user changing. For example, the alert can indicate that a particular user is now available to receive messages. An alert 404 also is depicted. The alert 404 can indicate to the user when his present availability status is scheduled to change. The alert 404 can be presented, for instance, when a particular amount of time remains for one or more time periods. A button 406 can be provided to facilitate selection of a snooze function which, as noted, can extend the subject time period. Another view (not shown) can be presented to provide various selectable snooze options to the user.

Figure 5:
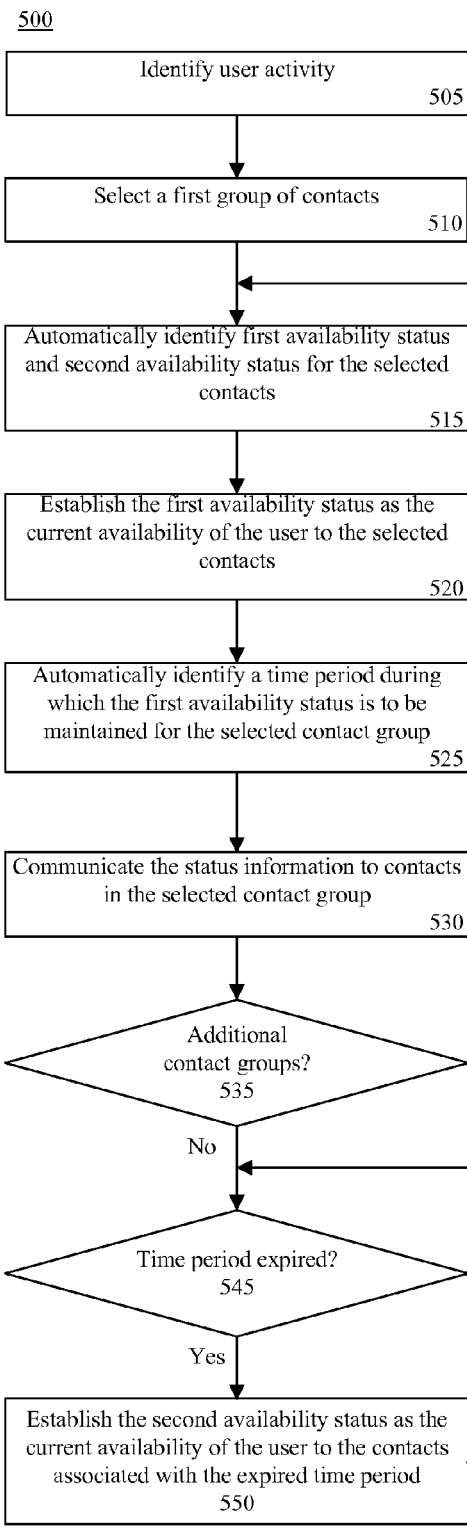
FIG. 5 is a flow chart illustrating a method of managing a communication status in accordance with another embodiment of the present invention.

FIG. 5 is a flow chart illustrating a method 500 of managing a communication status in accordance with another embodiment of the present invention. At step 505, user activity on a communication device can be detected. At step 510, a first group of contacts can be selected. At step 515, a first availability status and a second availability status can be automatically identified for the selected group of contacts. At step 520, the first availability status can be established as the current availability of the user to the selected contacts. At step 525, a time period during which the first availability status is to be maintained for the selected contact group can be automatically identified. At step 530 the status information can be communicated to contacts in the selected contact group.

Continuing to decision box 535, a determination can be made whether there are additional contact groups to be selected. If so, at step 540 a next contact group can be selected and the process can return to step 515. Steps 515-530 then can be repeated for the newly selected contact group. When there are no additional contact groups to be selected, the process can proceed to decision box 545. In response to an identified time period expiring, the process can proceed to step 550 and the second availability status can be automatically established as the current availability of the user to the contacts associated with the expired time period. Referring to decision box 555, if there are remaining time periods, the process can return to decision box 545 to wait for another time period to expire. When there are no further time periods left to expire, the process can end at step 560.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of managing a communication status, the method comprising:
   in response to a first user becoming active on a communication device:
   via the communication device, automatically establishing a first availability status as a current availability of the first user, wherein the first availability status corresponds to user preferences of the first user; and
   via the communication device, automatically identifying a first time period during which the first availability status is to be maintained as the current availability of the first user to at least a second user; and
   in response to the first time period elapsing, via the communication device, automatically establishing a second availability status as the current availability of the first user to the second user, wherein the second availability status corresponds to the user preferences of the first user.

2. The method of claim 1, wherein the first user becoming active comprises the first user logging onto the communication device.

3. The method of claim 1, wherein the first user becoming active comprises the first user entering an input into a user interface of the communication device.

4. The method of claim 1, further comprising:
   via the communication device, communicating a first indicator to the second user, the first indicator indicating the first availability status; and
   when the first time period has elapsed, via the communication device, communicating a second indicator to the second user, the second indicator indicating the first availability status.

5. The method of claim 4, further comprising:
   via the communication device, communicating to the second user a period indicator that indicates the first time period.

6. The method of claim 1, further comprising:
   via the communication device, automatically identifying a second time period during which the first availability status is to be maintained as the current availability of the first user to at least a third user; and
   responsive to the second time period elapsing, via the communication device, automatically establishing the second availability status as the current availability of the first user to the third user.

7. The method of claim 6, further comprising:
   via the communication device, communicating a first indicator to the third user, the first indicator indicating the first availability status; and
   when the second time period has elapsed, via the communication device, communicating a second indicator to the third user, the second indicator indicating the second availability status.

8. The method of claim 6, further comprising:
   via the communication device, communicating to the third user a period indicator that indicates the second time period.

9. The method of claim 1, further comprising:
   via the communication device, automatically establishing a third availability status as a current availability of the first user;
   via the communication device, automatically identifying a second time period during which the third availability status is to be maintained as the current availability of the first user to at least a third user; and
   in response to the second time period elapsing, via the communication device, automatically establishing a fourth availability status as the current availability of the first user to the third user.

10. The method of claim 9, further comprising:
    via the communication device, communicating a first indicator to the third user, the first indicator indicating the third availability status; and
    when the second time period has elapsed, via the communication device, communicating a second indicator to the third user, the second indicator indicating the fourth availability status.

11. The method of claim 9, further comprising:
    via the communication device, communicating to the third user a period indicator that indicates the second time period.

12. The method of claim 1, further comprising:
    via the communication device, restarting at least the first time period in response to a user selection.

13. A method of managing a communication status, the method comprising:
    via a communication device, establishing a first availability status as a current availability of a first user, wherein the first availability status corresponds to user preferences of the first user;
    via the communication device, identifying a first time period during which the first availability status is to be maintained as the current availability of the first user to at least a second user;
    via the communication device, identifying a second time period during which the first availability status is to be maintained as the current availability of the first user to at least a third user;
    responsive to the first time period elapsing, via the communication device, automatically establishing a second availability status as the current availability of the first user to the second user, wherein the second availability status corresponds to the user preferences of the first user; and
    responsive to the second time period elapsing, via the communication device, automatically establishing a second availability status as the current availability of the first user to the third user.

14. The method of claim 13, further comprising:
    via the communication device, communicating a first indicator to the second user, the first indicator indicating the first availability status; and
    when the first time period has elapsed, via the communication device, communicating a second indicator to the second user, the second indicator indicating the second availability status.

15. The method of claim 14, further comprising:
    via the communication device, communicating to the second user a period indicator that indicates the first time period.

16. The method of claim 14, further comprising:
    via the communication device, communicating the first indicator to the third user; and
    when the second time period has elapsed, via the communication device, communicating the second indicator to the third user.

17. The method of claim 16, further comprising:

via the communication device, communicating to the third user a period indicator that indicates the second time period.

18. The method of claim 13, further comprising:

responsive to a user selection, via the communication device, restarting at least one time period selected from the group consisting of the first time period and the second time period.

19. A computer program product comprising:

a computer storage media comprising computer-usable program code that manages a communication status, the computer storage media comprising:

computer-usable program code that, in response to a first user becoming active on a communication device:

automatically establishes a first availability status as a current availability of the first user, wherein the first availability status corresponds to user preferences of the first user; and automatically identifies a first time period during which the first availability status is to be maintained as the current availability of the first user to at least a second user; and computer-usable program code that, in response to the first time period elapsing, automatically establishes a second availability status as the current availability of the first user to the second user, wherein the second availability status corresponds to the user preferences of the first user.

20. The computer program product of claim 19, wherein the computer storage media further comprises:

computer-usable program code that communicates a first indicator to the second user, the first indicator indicating the first availability status; and computer-usable program code that, when the first time period has elapsed, communicates a second indicator to the second user, the second indicator indicating the first availability status.

* * * * *